United States Patent

Crabtree et al.

Patent Number: 5,918,863
Date of Patent: *Jul. 6, 1999

[54] SIDE LOAD COMPENSATING AIRSPRING FOR A VEHICLE SUSPENSION AND METHOD

[75] Inventors: Michael L. Crabtree, Arvada; Richard F. Stieg, Boulder, both of Colo.

[73] Assignee: The Gates Corporation, Denver, Colo.

[ * ] Notice: This patent is subject to a terminal disclaimer.

[21] Appl. No.: 08/979,004

[22] Filed: Nov. 26, 1997

Related U.S. Application Data

[62] Division of application No. 08/779,875, Jan. 6, 1997, Pat. No. 5,752,692.

[51] Int. Cl.⁶ .................................................. F16F 9/04
[52] U.S. Cl. .............................. 267/64.24; 267/64.21; 267/122; 280/DIG. 1
[58] Field of Search .......................... 267/64.24, 64.21, 267/64.19, 64.27, 122, 217, 64.11, 64.23; 280/698, 693, 672, 711, 691, 663, DIG. 1, 124.157, 124.158

[56] References Cited

U.S. PATENT DOCUMENTS

| | | | |
|---|---|---|---|
| 4,688,774 | 8/1987 | Warmuth, II | 267/64.21 |
| 4,712,776 | 12/1987 | Geno et al. | 267/64.21 |
| 4,763,883 | 8/1988 | Crabtree | 267/64.27 |
| 4,826,204 | 5/1989 | Cameron | 267/64.21 |
| 4,911,116 | 3/1990 | Warmuth, II | 267/64.24 |
| 4,961,594 | 10/1990 | Pees | 267/64.24 |
| 4,988,082 | 1/1991 | Pees | 267/64.24 |
| 5,129,634 | 7/1992 | Harris | 267/64.21 |
| 5,180,144 | 1/1993 | Hellyer et al. | 267/64.19 |
| 5,752,692 | 5/1998 | Crabtree et al. | 267/64.24 |

*Primary Examiner*—Douglas C. Butler
*Attorney, Agent, or Firm*—H. W. Oberg; C. H. Castleman; S. G. Austin

[57] ABSTRACT

A vehicle suspension with an airspring of the type with a flexible sleeve forming a chamber portion and a rolling lobe portion. The chamber portion is attached to a tilted closure and the rolling lobe portion of the airsleeve is attached to a piston that is transversely moved which introduces a shear force into the airsleeve and increases a surface area on an upward tilted side of the sleeve so as to provide side load compensation and where the axial length of the rolling lobe is substantially equalized to enhanced flexural life. A method of imparting a side load force with an airspring fastened between a fixed member and reciprocating member of a vehicle suspension, is provided by tilting a closure member of the airspring, transversely moving a piston connected to a rolling lobe portion of the airspring while distorting a chamber portion of the airspring, and eccentrically offsetting the piston in a manner that tends to equalize an axial length of a rolling lobe.

14 Claims, 2 Drawing Sheets

SIDE LOAD COMPENSATING AIRSPRING FOR A VEHICLE SUSPENSION AND METHOD

This is a division of application Ser. No. 08/779,875 filed Jan. 6, 1997, now U.S. Pat. No. 5,752,692.

BACKGROUND OF THE INVENTION

The invention generally relates to strut type suspension members for vehicles, but more particularly, the invention relates to a strut with an airspring having a sleeve with a flexible wall including a rolling lobe between telescoping members, but more particularly, the invention relates to a strut with an airspring arranged to provide side load compensation while simultaneously providing a sleeve arrangement that gives a rolling lobe an acceptable flexural life and a method for imparting a side load force to a vehicle suspension.

A strut of a vehicle suspension is typically oriented at an angle in relation to a reciprocal movement of a suspension for a wheel. The angular arrangement of the strut introduces a bending moment or torque into the telescoping members of the strut. Should such a moment be not countered or compensated with an opposite moment, it causes telescoping members of the strut to bind and results in vehicle ride harshness and reduced life of the strut. An opposite bending moment introduced into a strut is generally referred to in the industry as "side load compensation".

Airspring configurations have been disclosed with geometries that provide a compensating moment or side load compensation in a telescoping strut to oppose the moment placed on the strut by a vehicle suspension system. Examples of such airspring configurations for telescoping struts are disclosed in U.S. Pat. No. 4,688,774 to Warmuth, and divisional patent thereof, U.S. Pat. No. 4,911,416. The claimed feature of Warmuth '416 pertains to a tubular flexible member (airspring sleeve) with an end cut in a non-perpendicular plane and which end forms a rolling lobe of the airspring. In FIGS. 1 and 2 of Warmuth and herein exemplified by FIG. 2 the so formed rolling lobe Y-Z, Y'-Z' is of unequal length W-Z, W'-Z' when pressed against a rolling lobe surface of a piston of the airspring. The unequal axial length lobe results in a differential area where the force on one side of the piston (i.e. the inboard side of the strut) is greater than the force on the opposite side of the piston (i.e. the outboard side of the strut) causing some degree of side load compensation that counters a moment introduced into the strut by the suspension system. The asymmetry of unequal axial lobe length introduces a problem which is a substantially shortened flexural cycle life of the lobe (e.g. less than 100,000 cycles).

Another problem that an airspring sleeve with a non-perpendicular cut end introduces is that it defines a chamber where the surface area on the outboard side may be less than an inboard side because the sleeve length X'-W' on the outboard side is less than the sleeve length X-W on the inboard side as shown in FIG. 2. The unequal sleeve lengths X'-W', X-W results in a differential surface area in the chamber portion that causes a negative side load force which is counteractive to the side load force desired from the unequal axial length rolling lobe. In FIG. 3 the length of the sleeve forming the rolling lobe portion Y-Z, Y'-Z' is less than the sleeve length that forms the chamber portion X-Y, X'-Y'. However, in FIGS. 5–7 of Warmuth '416 (and herein exemplified by FIG. 3), the chamber portion is substantially formed along length R-S, R'-S' by a metal can. That part of the sleeve length which forms the rolling lobe portion S-T, S'-T' is substantially greater than that part of the sleeve which connects to the can. Consequently, there is very little sleeve length S-U available to form part of the chamber portion.

In Warmuth '774, FIGS. 5–7, an airspring with a piston eccentrically located in relation to a center line for a strut is disclosed in conjunction with a rolling lobe of unequal axial length. While the unequal length rolling lobe provides some side load compensation, the unequal length lobe is detrimental to lobe life as above discussed. In Warmuth FIG. 6, the lobe on the outboard side of the strut is greater in length than that of the lobe on the inboard side which, under Warmuth FIG. 3, imparts negative side load compensation (i.e. in the wrong direction). Also, in FIG. 6, the closure member attaching an end of the sleeve to the can is tilted clockwise while an axis of the sleeve faces toward the inboard side; a free length of the sleeve to where it bends at the rolling lobe has substantially the same projected length on both sides of the piston. Consequently, a difference in the free length of the sleeve per se on the inboard and outboard side is not available to define a differential area that may contribute to a side load compensation.

In FIG. 7 of Warmuth '774 (herein exemplified by FIG. 3), an airspring with rolling lobes of unequal axial lengths is shown. The rolling lobe length T-U against the piston on the inboard side is longer than the length T'-U' of the rolling lobe against the piston on the outboard side which, according to the teaching of Warmuth, provides side load compensation with a clockwise moment. One end of the sleeve is attached to a can that primarily forms a chamber of the airspring and where the closure member attaching and end of the sleeve to the can ring is tilted counterclockwise. The free length S-U of the sleeve to the formation of the rolling lobe on the inboard side is substantially longer than the free length S'-U' of the sleeve of the rolling lobe on the outboard side of the sleeve. The difference in length creates a surface area that is larger on the inboard side which also has a compensating moment which in this case is counterclockwise. Warmuth '774, does not consider any impact that the differential surface area has on side load compensation. The effect of differential surface area may completely offset or negate that side load compensation realized by the effect of a rolling lobe having unequal axial lengths.

Another airspring type strut with side load compensation is disclosed in U.S. Pat. No. 4,712,776 to Geno. As shown in FIG. 2 of Geno, an airspring has lobes of unequal axial lengths. The unequal length lobes have a detrimental impact on flexural life as above discussed in reference to Warmuth. In Geno, side load compensation is generated by means of a rigid member located inboard and attached to a can or canister portion that forms part of the airspring. The member restricts an outward expansion of the flexible sleeve on the inboard side. The sleeve exerts a pressure on the member which results in force on the strut to counteract lateral forces acting on the strut so as to provide a side load compensating moment. The sleeve and piston are arranged coaxially with the center line of the strut, and the canister forms a part of the operating volume for the airspring member.

U.S. Pat. No. 4,763,883 to Crabtree discloses another example of a strut at FIG. 13 where an airsleeve is oriented coaxial with the longitudinal axis of a strut. The airsleeve forms a chamber having a substantially larger diameter than that of the rolling lobe portion of the sleeve. However, Crabtree does not disclose a strut having a means for providing side load compensation.

SUMMARY OF THE INVENTION

In accordance with the invention, a side load compensating airspring strut is provided.

The strut has a flexible airspring sleeve with a chamber portion connected at a closure member that is tilted at an angle in relation to a longitudinal axis of the strut. A rolling lobe portion of the airsleeve is attached to a piston that is transversely moved toward the axis of the strut, which introduces a sheer force into the chamber portion of the sleeve and increases the surface area on one side of the sleeve while decreasing a surface area on a diametrically opposed side of the sleeve. The tilted closure member, change in sleeve surface area and shear force result in a side load compensation that is imparted to the strut. The airspring has a piston with a rolling lobe surface that is eccentrically offset in an amount that tends to equalize an axial length of the rolling lobe for durability.

A method of imparting a side load force with an airspring fastened between a fixed member and reciprocating member of a vehicle suspension, is provided by tilting a closure member of the airspring, transversely moving a piston connected to a rolling lobe portion of the airspring while distorting a chamber portion of the airspring, and eccentrically offsetting the piston in a manner that tends to equalize an axial length of a rolling lobe.

An object of the invention is to provide an airspring strut having side load compensation but where the flexural life of a rolling lobe is not substantially compromised by an unequal axial length of the rolling lobe against a piston.

This and other objects or advantages of the invention will be apparent after reviewing the drawings and description thereof wherein:

FIG. 1 is a partially cut-away axial cross-section of a prior art airspring strut; and FIG. 2 is a partially cut-away axial cross-section of a prior art airspring strut; and FIG. 3 is a partially cut-away axial cross-section of a prior art airspring strut.

DESCRIPTION OF PREFERRED EMBODIMENT

Figure 1:
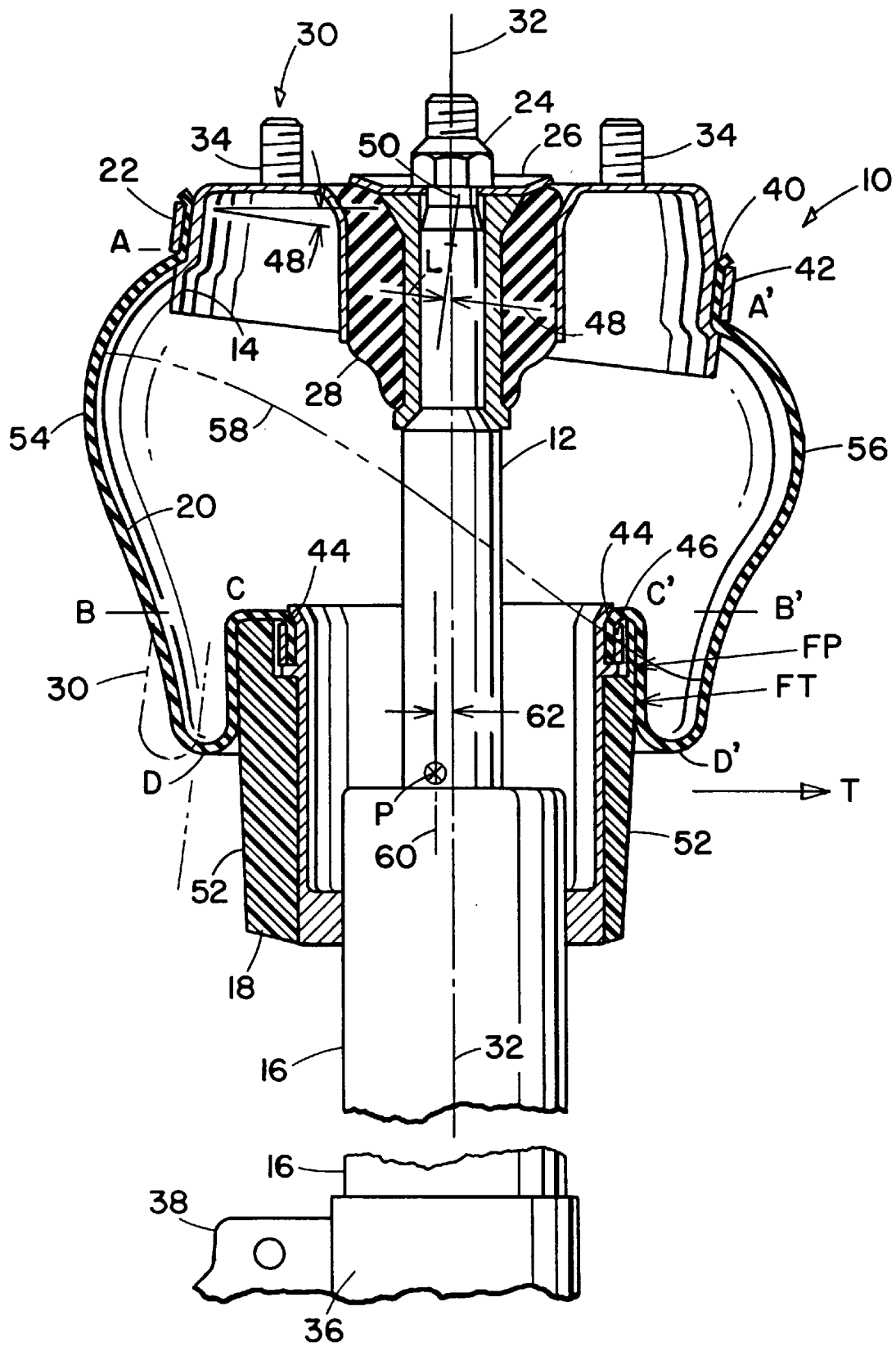

Referring to FIG. 1, a telescopic suspension strut 10 of the airspring type is provided for use with a vehicle suspension system not shown. This strut is of the type with a fixed member 12, a closure member 14 attached to the fixed member, a reciprocating member 16 that includes a hydraulic damping system (not shown), a piston 18 attached to the reciprocal member, and a flexible sleeve 20 connected between the closure member 14 and piston 18. The fixed member 12 is attached to the closure member 14 which may be in the form of a canister having any desired shape, such as a "tube-pin" shape as shown with a cylindrical surface 22 for attachment to the flexible sleeve 20. The closure member 14 attaches to the fixed member of the strut by way of a fastener 24, a washer 26, and a grommet 28. Optionally, the closure member may incorporate a bearing assembly (not shown) which permits the strut to be rotated about its longitudinal axis 32 for steering a vehicle. The closure member may be attached to a vehicle by means of threaded fasteners 34.

The reciprocating member has an end 36 that attaches at an outboard side 38 to a reciprocating part of a vehicle suspension system (not shown). The flexible sleeve is of the elastomeric type that is reinforced with embedded textile cords. The flexible member may have any desired construction but preferably, has a construction of the type as disclosed in U.S. Pat. No. 4,763,883 to Crabtree where the cords are disposed at opposite helical angles, and more preferably, where the airsleeve is contoured as taught by Crabtree.

The flexible sleeve 20 has a chamber portion A-B, A'-B' with an end 40 connected at the cylindrical surface 22 of the closure member 14 by means of a ring 42 that may be crimped or swaged so as to clamp end 40 to the closure member.

The flexible sleeve 20 has a rolling lobe portion B-C, B'-C' that is connected at an end 44 to the piston 18 by means of a ring 46 which may be crimped or swaged so as to clamp the end 44 to the piston. Preferably, the ring 46 has an axis that is concentric with the longitudinal axis 32 of the strut which helps to equalize an axial length of the rolling lobe as hereinafter set forth.

Closure member 14 is tilted at an angle 48 in relation to the longitudinal axis 32 of the strut whereby an axis 50 for the cylindrical surface 22 and connected end 40 of the sleeve is directed toward an outboard side of the strut.

Left unconstrained, the rolling lobe B-C, B'-C', would take a free position such as along dotted line 30 toward the outboard side of the strut. The piston is transversely moved and rotated about a transverse axis P from such a free position and in a direction T. The movement is resisted by the flexible member which introduces a shear force into the flexible sleeve that is reacted as a force F against a rolling lobe surface 52 of the piston.

The tilted closure member in conjunction with the transversely moved piston distorts the chamber portion A-B by increasing its surface area 54 on an upward tilted side of the chamber portion, and distorting a diametrically opposed downward tilted side of the chamber portion A'-B' by decreasing its surface area 56 which results in a differential surface area that is larger on the outboard side of the flexible sleeve. It is theorized that the larger surface area under pressure causes a few cords of the imbedded reinforcement to have a slightly higher tension so as to pull along their length as shown by phantom line 58 so as to effectively pull against the piston generating some force FP.

Preferably, ends 40 and 44 of the flexible member are cut in a plane substantially perpendicular to the longitudinal axis of the sleeve. With such a cut and a symmetrical, co-axial rolling lobe surface, the rolling lobes would have unequal axial lengths. It has been determined that while unequal axial length lobes would provide some side load compensation, the unequal lengths are detrimental to the flexural life of the lobe. Preferably, the piston has a rolling lobe surface 52 eccentrically offset in a direction generally facing the side of the flexible sleeve with the increased surface area (i.e. outboard side) where the rolling lobe surface is offset by moving a longitudinal axis 60 of the piston an amount 62 so as to substantially equalize the axial lengths C-D, C'-D' of the rolling lobe. The ring 44 when concentric with the longitudinal axis 32 of the strut, helps in equalizing the axial length of the rolling lobe.

The number of degrees that the closure member is tilted has an impact on side load compensation. The greater the angle, the greater the side load compensation. It is preferred that the closure member be tilted at an angle from about 3 to about 20 degrees. The tilt in angle in combination with the translation of the piston member causes the flexible sleeve to distort. By empirical testing, it has been determined that the change in surface area ranges from about 1 to 15 percent as the closure member is tilted from about 3 to 20 degrees.

Figures 2, 3:
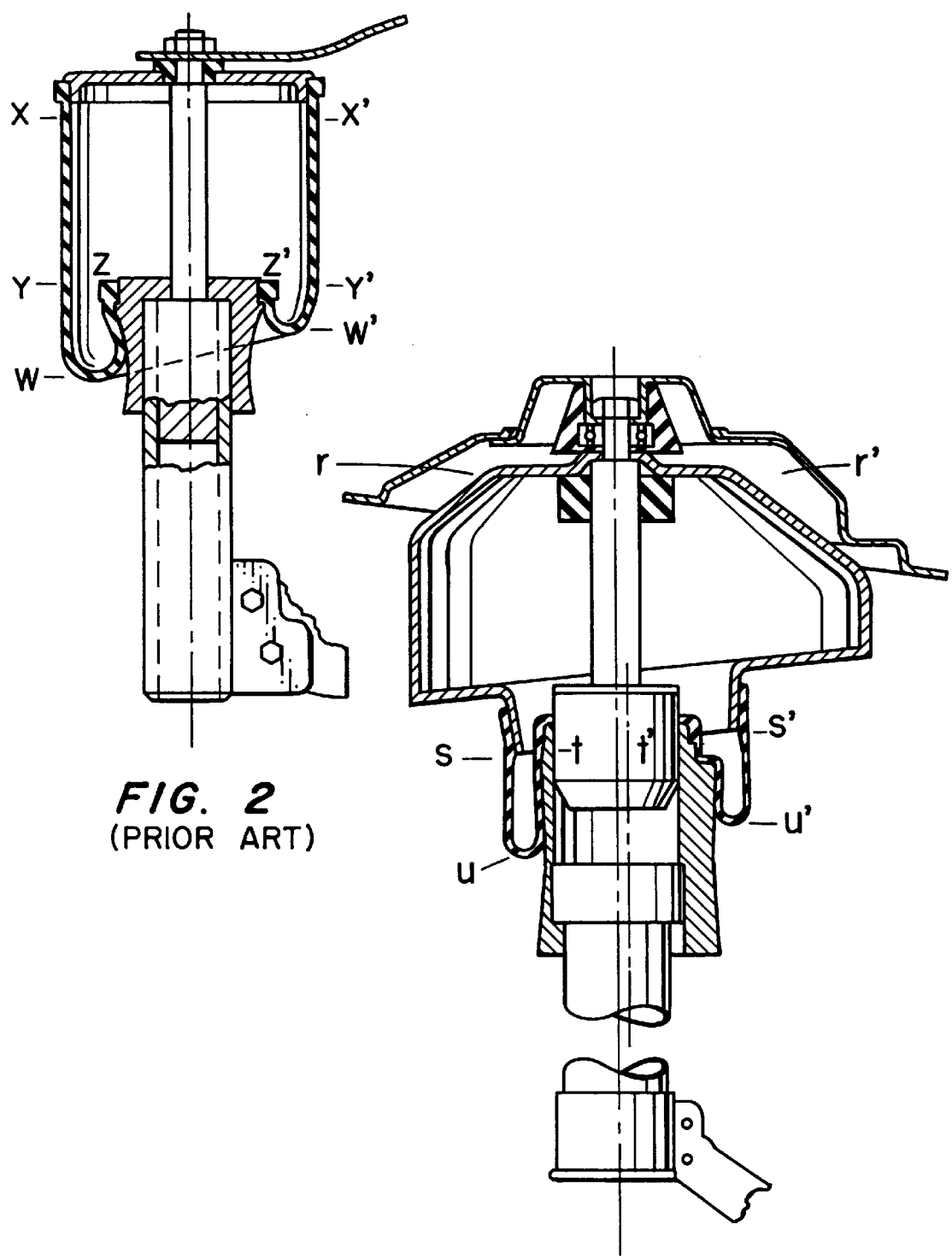

Generally, square cut cylindrical sleeves of the type exemplified by FIGS. 2 and 3 will not permit a tilting of the closure member beyond about 7 degrees. For this reason, flexible sleeves of the Crabtree type (U.S. Pat. No. 4,763,883) are preferred where the chamber portion may have an inside diameter that is at least from about 1.1 to about 1.5 times the maximum inside diameter of the rolling lobe portion. The increased diameter of the chamber portion permits the closure member to be tilted up to 20 degrees without the piston contacting the flexible member as the piston reciprocates into the chamber.

To illustrate the features of the invention, an airspring strut was constructed with a airsleeve having a chamber portion length of 85 mm, a chamber portion diameter of 200 mm, and a rolling lobe surface diameter of 150 mm. The closure member was tilted at 7.0 degrees which resulted in a differential surface area between the outboard and inboard side of the sleeve of approximately 10 percent. The rolling lobe surface of the piston was eccentrically offset 4 mm and arranged so that its axis was substantially parallel to the axis of the strut. The so constructed airspring, when measured empirically, exhibited a side load force of 750 Newtons (170 lbs) when the airsleeve was pressurized to 480 kpa (70 psi). The airspring demonstrated a flexural life greater than 500,000 cycles.

The foregoing detail description is used for purpose of illustration only and is not intended to limit the scope of the invention which is to be determined from the appended claims.

What is claimed is:

1. A vehicle suspension with an airspring attached between a fixed member and a reciprocating member, the airspring with a flexible sleeve having (1) a chamber portion connected at an end to a closure member that is attached to the fixed member and (2) a rolling lobe portion connected at an end to an eccentrically offset piston that is attached to the reciprocating member, the sleeve of an elastomeric material and reinforced with embedded textile cords, wherein the improvement comprises:

the chamber portion connected to a closure member that is tilted at an angle in relation to a longitudinal axis of the piston;

the rolling lobe portion connected to the piston, and the piston transversely moved from a free position whereby the chamber portion is distorted;

the piston having a rolling lobe surface eccentrically offset an amount that tends to equalize an axial length of the rolling lobe portion around the rolling lobe surface of the piston; and wherein, reaction to the tilted closure member, distorted chamber portion and transversely moved piston, results in a side load force.

2. The vehicle suspension as claimed in claim 1 wherein the closure member is tilted in relation to the longitudinal axis of the piston at an angle from about 3 to 20 degrees.

3. The vehicle suspension as claimed in claim 1 wherein the surface area of the upward tilted side of the chamber portion is from about 1 to 15 percent greater than the surface area of the downward tilted side of the chamber portion.

4. The vehicle suspension as claimed in claim 1 wherein the rolling lobe surface of the piston is eccentrically offset from about 1 to 10 mm.

5. The vehicle suspension as claimed in claim 1 wherein the end that connects the rolling lobe portion to the piston is cut in a plane substantially perpendicular to a longitudinal axis of the sleeve.

6. The suspension strut as claimed in claim 1 wherein the end that connects the chamber portion to the closure member is cut in a plane substantially perpendicular to a logitudinal axis of the sleeve.

7. The vehicle suspension as claimed in claim 1 where a maximum inside diameter of the chamber portion is at least from about 1.1 to 1.5 times a maximum inside diameter of the rolling lobe portion.

8. The vehicle suspension as claimed in claim 1 wherein the axis of the piston is rotated about a transverse axis an opposite angle substantially equal in degrees to the tilted angle of the closure member.

9. The vehicle suspension as claimed in claim 1 wherein the end of the rolling lobe is connected to the piston with a ring.

10. A method of providing a side load force between a fixed member and reciprocating member with an airspring including a flexible sleeve having (1) a chamber portion connection at an end to a closure member attached to the fixed member and (2) a rolling lobe portion connected at an end to an eccentrically offset piston that is attached to the reciprocating member, wherein the improvement comprises the steps of:

tilting the closure member that is connected to the chamber portion to an angle in relation to a longitudinal axis of the piston;

transversely moving the piston with the connected rolling lobe portion from a free position while simultaneously distorting the chamber portion;

eccentrically offsetting the piston and attached rolling lobe portion while tending to equalize an axial length of the rolling lobe portion around a rolling lobe surface of the piston; and imparting a side load force between the fixed member and reciprocating member by tilting the closure member, distorting the chamber portion and eccentrically offsetting the piston and the rolling lobe portion.

11. The method as claimed in claim 10 including the step of tilting of the closure member at an angle from about 2 to 20 degrees.

12. The method as claimed in claim 10 including the step of eccentrically offsetting the rolling lobe surface of the piston from about 1 to 10 mm.

13. The method as claimed in claim 10 including the steps of forming the chamber portion to have a maximum inside diameter and forming the rolling lobe portion to have a maximum inside diameter such that said diameter of the chamber portion is from about 1.1 to 1.5 times said maximum diameter of the rolling lobe portion.

14. The method as claimed in claim 10 including the step of rotating the piston about a transverse axis an angle substantially opposite and equal in degrees to the angle that the closure member is tilted.

* * * * *